United States Patent
Chen et al.

(10) Patent No.: US 10,288,039 B2
(45) Date of Patent: May 14, 2019

(54) ANTI-OSCILLATION APPARATUS AND METHOD FOR SECURING WIND TURBINE BLADES AGAINST OSCILLATIONS

(71) Applicant: Vestas Wind Systems A/S, Aarhus N. (DK)

(72) Inventors: Zhen-Zhe Chen, Ringkobing (DK); Ryan Link, Houston, TX (US); Lars Risager, Ry (DK)

(73) Assignee: Vestas Wind Systems A/S, Aarhus N. (DK)

( * ) Notice: Subject to any disclaimer, the term of this patent is extended or adjusted under 35 U.S.C. 154(b) by 568 days.

(21) Appl. No.: 15/197,000

(22) Filed: Jun. 29, 2016

(65) Prior Publication Data

US 2017/0002797 A1    Jan. 5, 2017

Related U.S. Application Data

(60) Provisional application No. 62/186,706, filed on Jun. 30, 2015.

(30) Foreign Application Priority Data

Jul. 10, 2015  (DK) .................................. 2015 70455

(51) Int. Cl.
F03D 7/02    (2006.01)
F03D 1/06    (2006.01)
F03D 80/50   (2016.01)

(52) U.S. Cl.
CPC ......... F03D 7/0296 (2013.01); F03D 1/0675 (2013.01); F03D 7/022 (2013.01);
(Continued)

(58) Field of Classification Search
CPC .............................. F03D 7/0296; F03D 1/0675
See application file for complete search history.

(56) References Cited

U.S. PATENT DOCUMENTS

| | | | |
|---|---|---|---|
| 8,834,117 B2 * | 9/2014 | Yarbrough | F03D 80/30 416/146 R |
| 2008/0282590 A1 | 11/2008 | Wobben | |
| 2012/0301293 A1* | 11/2012 | Bech | F03D 80/00 416/1 |

FOREIGN PATENT DOCUMENTS

| DE | 202004016460 U1 | 12/2004 |
|---|---|---|
| DE | 102011111967 B3 | 1/2013 |

(Continued)

OTHER PUBLICATIONS

Danish Patent and Trademark Office, Search Report Issued in Applicatio No. PA 2015 70455, dated Feb. 1, 2016.
(Continued)

*Primary Examiner* — Richard A Edgar
*Assistant Examiner* — Michael L Sehn
(74) *Attorney, Agent, or Firm* — Wood Herron & Evans LLP

(57) ABSTRACT

A tool for reducing vibrations in wind turbine blades at standstill includes an elongate sleeve formed of a net-like material for fitting over the blades, wherein the sleeve is formed with at least one protruding structure extending along at least a part of the length of the sleeve having an undulating form, and which is arranged so that when the sleeve is fitted on a blade the protruding structure or structures lie at the leading and/or trailing edge of the blade. A method for securing wind turbine blades against oscillations is also disclosed.

15 Claims, 3 Drawing Sheets

(52) U.S. Cl.
CPC .......... *F03D 80/50* (2016.05); *F05B 2260/96* (2013.01); *Y02E 10/721* (2013.01)

(56) References Cited

FOREIGN PATENT DOCUMENTS

| | | |
|---|---|---|
| EP | 2098721 A2 | 9/2009 |
| EP | 2669238 A1 | 12/2013 |
| GB | 2475865 A | 6/2011 |
| JP | 3184158 U | 6/2013 |

OTHER PUBLICATIONS

European Patent Office, European Search Report in EP Application No. 16177006, dated Nov. 8, 2016.

\* cited by examiner

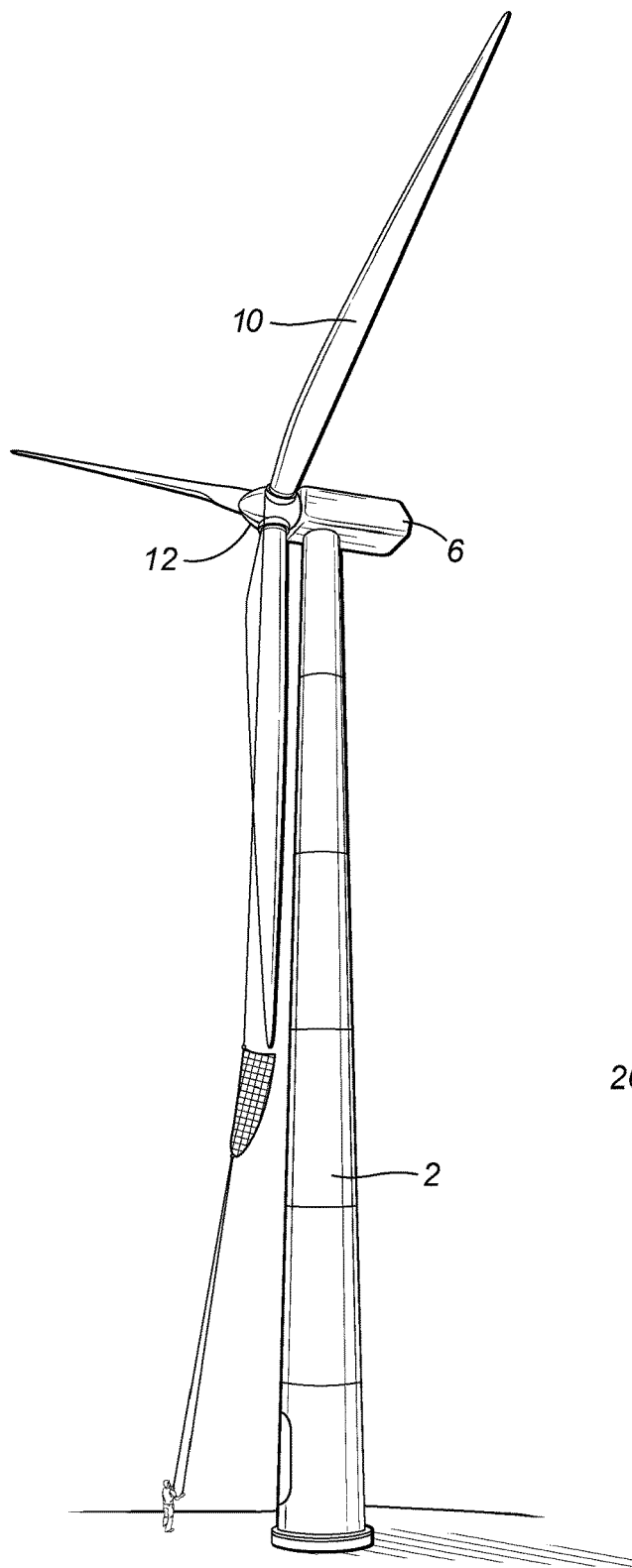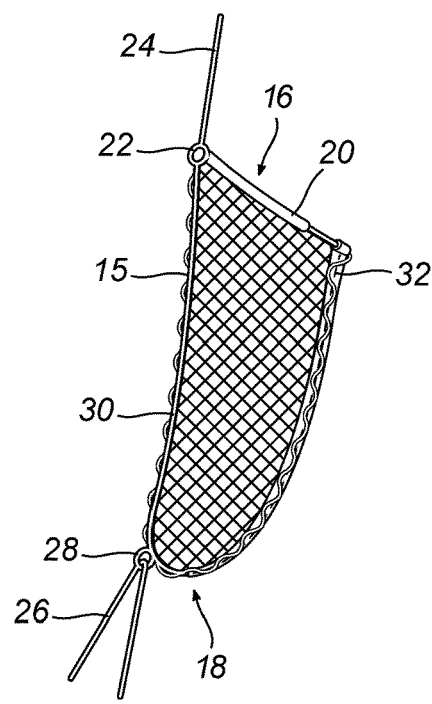
Fig. 4
Fig. 5

ANTI-OSCILLATION APPARATUS AND METHOD FOR SECURING WIND TURBINE BLADES AGAINST OSCILLATIONS

TECHNICAL FIELD

This invention relates to an anti-oscillation tool and to a method for securing wind turbine blades against oscillations.

BACKGROUND

When a wind turbine is not generating power, such as before connection to the grid or during times of maintenance, the blades of the turbine are to as great an extent as possible turned out the wind by means of the yaw drive and pitch drives to minimise the forces experienced from the incident wind. However, when at standstill the blades of the wind turbine are potentially prone to edgewise blade oscillations (edgewise being the direction from the leading edge to the trailing edge of the blade) resulting from the air flow across or around the blade, when the wind hits the blade from the side.

The problem is caused by the largely unstable flow of air around the rotor blade when the blade is pitched out of the wind. The air flows around the curved surface of the blade, but cannot stay attached to the blade surface in laminar flow because the blade is not pitched correctly to support lift. At high angles of attack stall is observed, with associated negative aerodynamic damping, resulting in instability of flow which can give rise to blade oscillations.

If the wind turbine blades can be feathered with respect to the wind, then the wind flows around the blades smoothly, but without power to continuously adjust the blade pitch, there will be periods when the wind direction will inevitably change and result in a situation where the flow around the blade is not smooth. At higher angles of attack a vortex-shedding phenomena can occur where vortices form on edges of the blade and are shed in a rhythmic pattern. These oscillations are typically experienced first at the tip of the blade, where the reduced diameter and lighter frame offer less resistance to the rhythmic shifting force provided by the air. The worst case is when the incident wind meets the blade perpendicular to one of its flat surfaces and has to flow around the leading and trailing edge of the blade. In this situation the vortices can be shed in a manner which creates significant vibration, particularly if resonance phenomena are exhibited, even to the extent that blade damage can result.

Many wind turbines therefore comprise mechanical or hydraulic devices that dampen oscillations induced in the wind turbine blade before they can develop a magnitude that is sufficient to damage the blade. Although, such devices do solve the problem, they can be expensive and difficult to install. It has been appreciated that there is a need for an apparatus and method for addressing such oscillations in the blade.

The Applicant has previously disclosed in EP2507513, the contents of which are hereby incorporated by reference, the use of a tool for fitting over blades at standstill in the form of a sleeve-like device formed of a net-like material having an open mesh. The mesh material of the sleeve is able to disrupt the smooth flow of air over the blade by forming a turbulence-inducing non-aerodynamic surface which thereby significantly reduces the instability associated with stall generation.

The present invention is a development of this tool directed particularly at reducing the effect of vortex-induced vibration.

SUMMARY

In a first aspect the invention resides in a device for reducing vibrations in wind turbine blades at standstill comprising an elongate sleeve formed of a net-like material for fitting over the blades, wherein the sleeve is provided with at least one protruding structure extending along at least a part of the length of the sleeve having an undulating form.

The undulating form of the protrusions offers an enhanced disruption of flow over the blade surface, especially at the locations of the undulating protruding structures, and hence reduced vortex-induced vibration.

In one form the sleeve is provided with a pair of undulating protruding structures at both opposite edges of the sleeve, which edges in use lie against both leading and trailing edges of the blade. Alternatively, an undulating structure may be provided at only one edge.

The protruding structures may comprise a length of rope, wire or tubing or extruded material which is secured on or within the mesh material. Conveniently, the structure is a length of rope which is stitched onto the mesh material in the undulating configuration.

In an alternative form the protruding structure can be incorporated into the seam of the sleeve, or even actually constituted by the seam.

The undulations of the protruding structure or structures preferably meet certain parameters for most effective aerodynamic effect. The protruding structure or structures preferably have a diameter between 0.6 mm and 15 mm, more preferably about 8 to 10 mm. The ratio of peak to trough distance (H) to peak to peak spacing (L) is preferably in the range 10 to 30%, more preferably about 15%. The ratio of peak to trough distance (H) relative to blade thickness (T) is in the region 20 to 100%, more preferably about 20 to 40%.

Where the peak to trough distance H is substantial the protruding structure or structures may extend alternately onto a surface of the sleeve which overlies a pressure surface of the blade and then onto a surface of the sleeve which overlies the opposite suction surface of the blade, wrapping around the blade leading and/or trailing edge.

In a further aspect the invention resides in a method of operating a wind turbine to inhibit oscillations induced by the air flow across the blades when the wind turbine is a non-operational mode using a tool as described above, the method comprising releasably locking the wind turbine rotor in place, and securing and retaining whilst the turbine is in a non-operational mode one or more said tools in place on the rotor blades so that the sleeve covers a region of the blade surface and provides a non-aerodynamic outer surface for inducing turbulence in the air flow across the blade.

BRIEF DESCRIPTION OF THE DRAWINGS

The invention will now be described in more detail, and by way of example, with reference to the drawings, in which:

FIG. 4 is a view of a wind turbine showing the fitting of a tool on an assembled turbine; and FIG. 5 is a detail to show the tool being drawn up towards a blade in a fitting operation.

DETAILED DESCRIPTION

Figure 1:
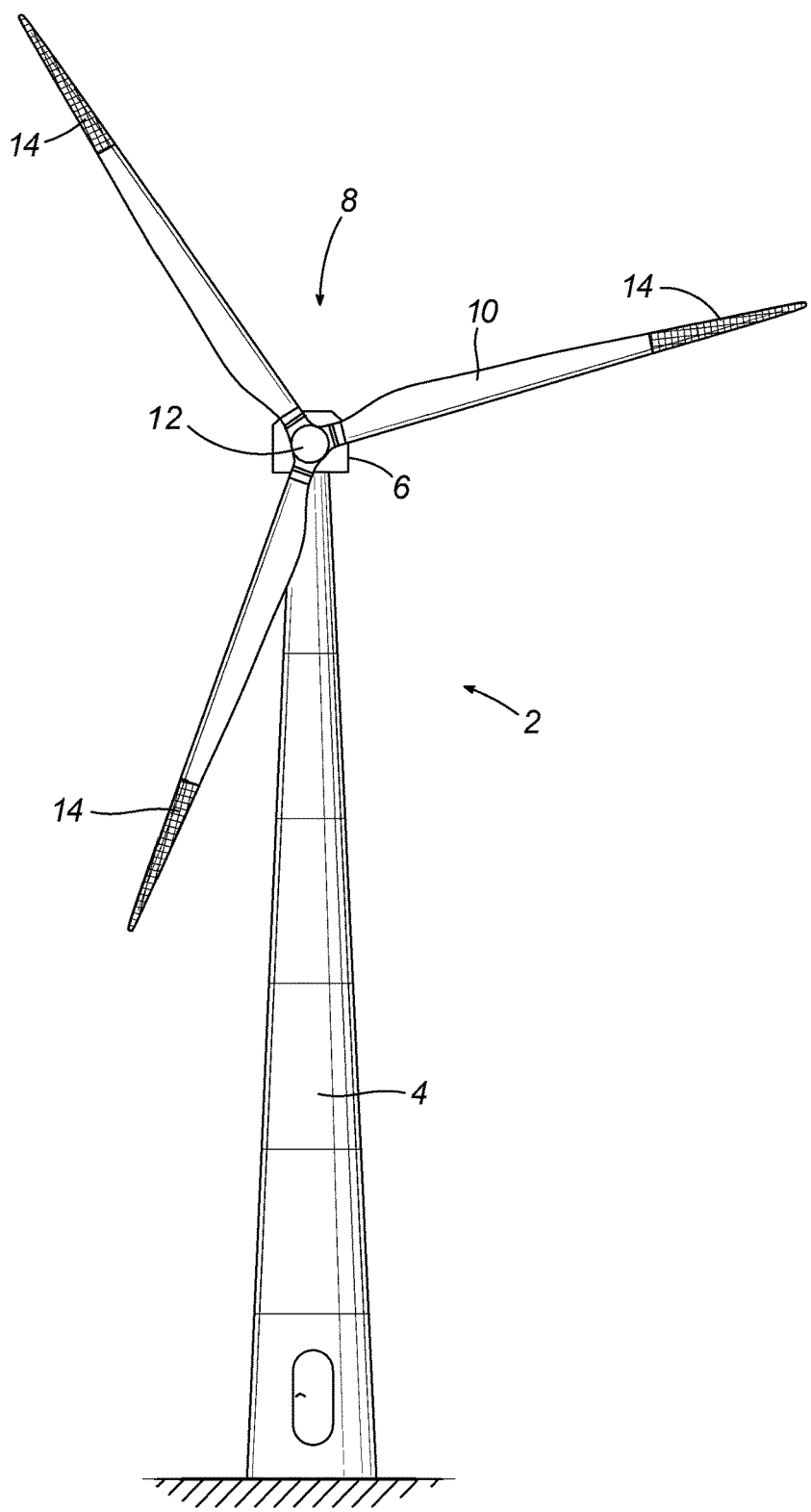
FIG. 1 is a schematic illustration of a wind turbine, including an anti-oscillation tool according to the invention fitted to the wind turbine blades.

A typical horizontal axis wind turbine is illustrated in FIG. 1 to which reference should now be made. FIG. 1 illustrates a wind turbine 2, comprising a wind turbine tower 4 on which a wind turbine nacelle 6 is mounted. A wind turbine rotor 8 comprising at least one wind turbine blade 10 is mounted on a rotor hub 12.

The hub 12 is connected to the nacelle 6 through a shaft (not shown) extending from the nacelle front. The nacelle 6 can be turned, using a yaw drive positioned at the top of the tower 4, to change the direction in which the rotor blade hub 12 and the blades 10 are facing. The blades are aerodynamically profiled so that they experience a 'lift' or pressure from the wind as the wind flows past the surface of the blade. The angle or pitch at which the leading surface of the blade aerodynamic profile meets the incident wind can be altered using a pitch drive that turns the blades 10 with respect to the hub 12.

The wind turbine illustrated in FIG. 1 is of utility scale turbine of the type suitable for use in large scale electricity generation on a wind farm, but might equally be a smaller model for domestic use. A typical commercial wind turbine, for example one that is designed to generate say 3 MW of power, can stand approximately 100 meters high and have wind turbine blades with a length of around 50 m or more. The size of the wind turbine blade, and in particular the area that is swept out by the blades as they turn in the wind is linked to the amount of energy the turbine can extract from the wind. In commercial energy generation wind turbines are therefore large so that they provide the greatest generation capacity.

In normal generation, the yaw drive turns the nacelle 6 so that the rotor 8 of the wind turbine is pointed into the wind. The pitch of the blades can then be adjusted so that the force they experience from the wind is maintained within safe operating parameters, while generating as much energy from the incident wind as possible.

As discussed above, in situations where the turbine and blades are at standstill (for example during initial installation or during service or repair) the blades can be susceptible to edgewise vibration.

FIG. 1 shows an anti-oscillation tool 14 fitted to each of the blades 10 which serves to alter the aerodynamic properties of the blades.

The anti-oscillation tool 14 comprises a sleeve 15 that is fitted over the tip of a wind turbine blade 10 when the blade is in a stationary position. Attachment of the sleeve can be carried out in situ when the wind turbine blades of an operational wind turbine have been locked in position for maintenance or repair, or after their initial installation on the hub 12. Alternatively, the sleeve 15 can be attached to the blades 10 prior to installation of the blades 10, for example at the factory or at the wind farm site prior to lifting and fitting of the blades 10 and before the wind turbine is connected to the grid to output electricity. In both cases, therefore, the wind turbine can be thought of as being in a non-operational mode.

It will be appreciated that the temporary anti-oscillation surface provided by the tool 14 may cover only the region of the blade from the tip to an intermediate portion of the blade, or may cover the entire length of the blade, or solely even cover just an intermediate region away from tip of the blade 10. As noted above, however, it is usually preferred to cover the tip of the blade 10 as this is the region most susceptible to oscillation. It will be appreciated that as the length of a wind turbine blade can be of the order of 40-50 m in length, the length of the tool can be anywhere in the range of a few meters to a few tens of meters. For a blade of about 55 m it is found that a length of about 20 m is preferred; whilst the technical benefit increases with a longer tool the additional benefit is limited once about 40% of the blade length is covered.

Figure 2:
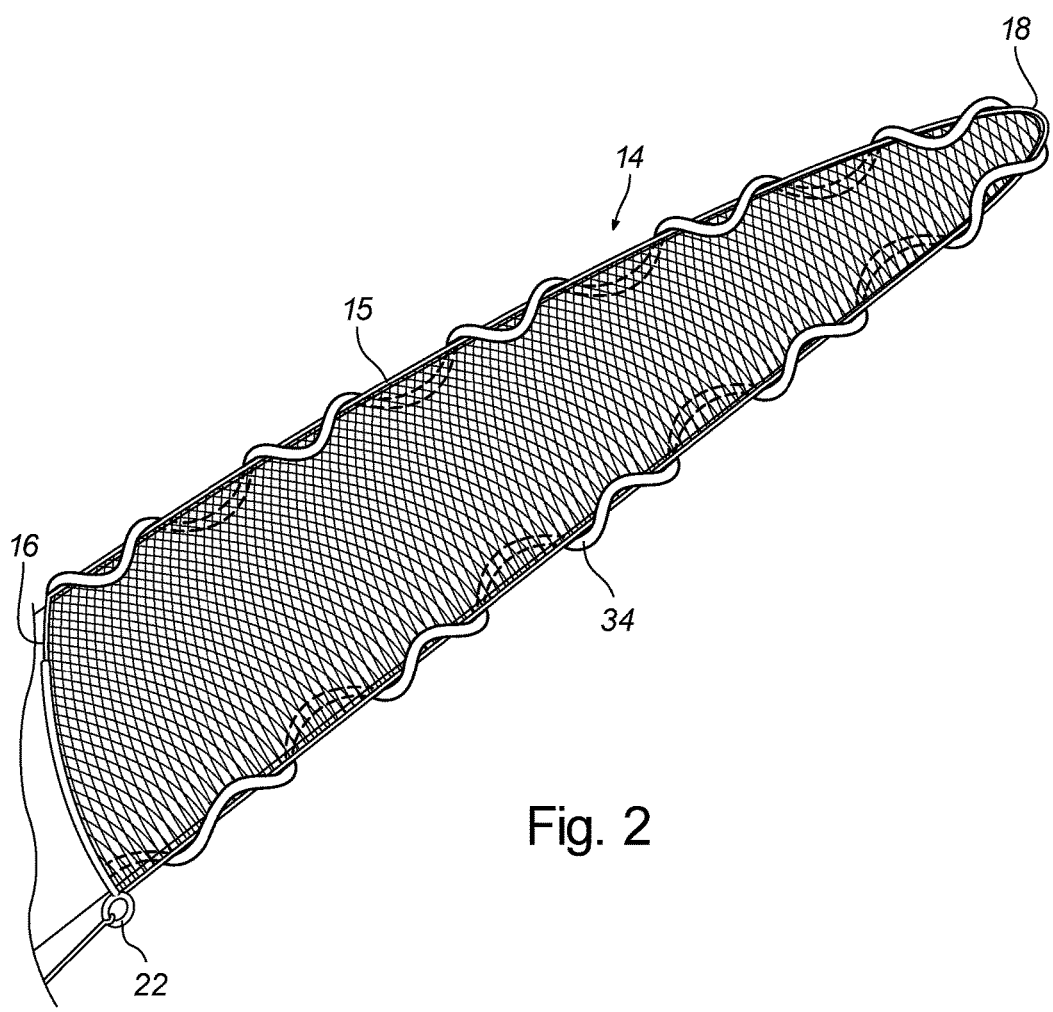
FIG. 2 is a perspective view of an embodiment of an anti-oscillation tool fitted to a wind turbine blade.

The construction of the anti-oscillation tool 14 is shown in more detail in FIG. 2. The tool 14 comprises the elongate sleeve 15 formed of substantially net or mesh-like or otherwise coarse material having at least one open end 16 for manoeuvring onto and over the tip of the wind turbine blade 10. In the example shown in FIG. 2, the tool 14 has the shape of a sock or pocket and the end 18 of the tool opposite the open end 16 is therefore closed. In other examples the end 18 may also be open, in which case the tool 14 is closer in shape to a tubular wind sock having two open ends. Although, the tool 14 can be thought of as substantially tubular, in that its length dimension is larger than its width, it will be appreciated the sleeve 15 tapers towards its end 18 to fit more snugly around the smaller circumference of wind turbine blade tip. Further, it may also have a flattened cross-section to follow the flattened cross-section of the blade away from the root.

The open end 16 of the sleeve comprises a resilient reinforcement 20 (see FIG. 5) that both provides structural strength to the open end 16 of the sleeve and in a default position keeps the end 16 of the sleeve sprung open for ease of positioning the sleeve on the blade tip. The resilient reinforcement 20 can be comprised of a metal, plastic or other suitable material as desired.

The resilient reinforcement 20 has a loop or eye 22 at its centre that provides an attachment point for one of two guide ropes or lines 24 and 26 by which the tool can be hoisted into position. The resilient reinforcement 20 is attached to the tool 14 so that the loop 22 is conveniently disposed at one end of the tool 14. The other guide rope 26 is secured to a second loop or eye 28 attached at the other end 18 of the tool 14 directly below and on the same edge of the tool. This edge of the tool may comprise a reinforcing cord 30, such as a rope or cable, connected between the two loops 22 and 28. The loop 28 can in fact be attached directly to the reinforcing cord 30. The reinforcing cord 30 prevents damage to the tool 14 when the force on the guide ropes 24 and 26 becomes large, such as when the tool 14 is being pulled into position.

In one embodiment, the sleeve 15 of the tool can be made from a single piece of material, with the reinforcing cord 30 being located in its centre, and the edges of the material being folded over and connected together, by any suitable means, such as stitching or sewing. In this case, the opposite edge of the tool may comprise a stitch line or seam 32.

The material making up the tool 14 may be any material that can be formed into the sock or pocket shape mentioned above, but that will not be too coarse to damage the surface of the wind turbine blade as the tool is attached. Fibre materials that are soft and flexible are therefore advantageous, such as but not limited to organic fibres like hemp, sisal, jute, and cotton; synthetic or artificial fibres such as polyamide, polypropylene, polyethylene or any suitable thermoplastic fibrous material; and monofilament materials, such as polyethylene or rubber. In the examples described here, the weave or mesh size of the netting is in the range 10×10 mm to 100×100 mm in mask. A mesh of about 30×30 mm is found to be particularly effective. Depending on the application, it could also have a finer or a more open mesh.

The material is preferably a net-like material, as this has been found to be effective in causing turbulence at the blade surface and in reducing vortex shedding, by efficiently covering the leading edge of the blade. The weave of the net ensures an irregular surface air boundary between the air and the blade, and is advantageously used as the sleeve as it is easy to produce, and therefore not costly. It is not however essential to use a net-like material however as the anti-oscillation sleeve, and it will be appreciated that other materials could be used that have a coarse external surface, either due to the weave of the material or due to the presence of protrusions, and/or indentations specifically engineered into its surface.

Figure 3:
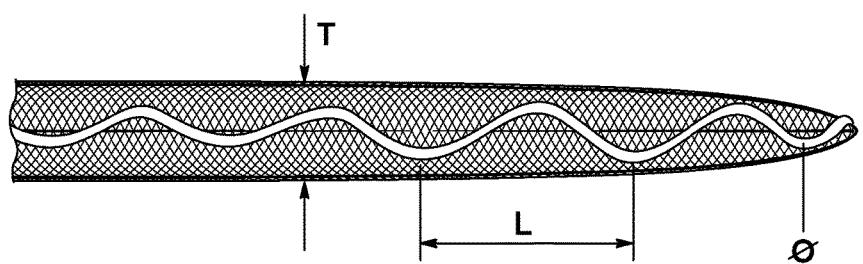
FIG. 3 is a view of the leading edge of the blade with anti-oscillation tool fitted thereon.

As is shown in FIGS. 2 and 3, the tool is further provided at an edge region with a protruding structure 34 which extends along the length of the sleeve at a position where it lies over an edge of the blade. As illustrated in FIG. 2 a pair of protruding structures are provided, arranged to lie at both the leading edge and trailing edge of the blade. The structure may however alternatively be arranged to overlie only one or other of leading and trailing edges. The protruding structure 34 comprises a body which is integrated into the structure of the tool 14 and which in use protrudes from the surface of the blade 10 thereby forming an additional obstruction to air flow over the blade. The protruding structure has a wavy or undulating form of "peaks" and "troughs". In a preferred form the undulations extend alternately at least a short distance onto what forms opposite sides faces of the tool 14 when fitted on a blade, so that in use the undulations extend alternately onto and over opposite pressure and suction surfaces of the blade; FIG. 2 shows the undulations on the opposite lower (pressure)) surface of the blade in dotted lines.

In one form the protruding structure 34 comprises a body of material which is integrated into or secured onto the mesh of the net-like material. In a preferred form this comprises a length of rope of diameter significantly greater than the material making up the weave of the mesh. The rope is secured onto or into the mesh by stitching or ties or the like, with the undulating form achieved by the securing of the material onto the mesh in the undulating pattern. The rope is secured onto the mesh in a manner so that there is limited gap between the rope and underlying blade.

In one version the rope might be incorporated into the seam 32 of the sleeve 15.

Alternatively, the protruding structure may comprise a wire material or rope-covered wire. The wire may afford a degree of stiffness to provide the undulating form. In another alternative the protruding structure may comprise a tubular body or body of cylindrical form such as hollow plastics tubing or foam body, where the material is arranged on the mesh material in the undulating shape, and secured to the mesh material. As a further alternative, a material which is formed into the undulating shape for example by moulding may be used, for example a moulded foam or plastics body.

In a still further form the protruding structure is actually constituted by the seam 32 of the sleeve 15 which is gathered and stitched to form the undulating protruding structure.

In a preferred form, the dimensions and configuration of the undulations of the protruding structure should meet certain preferred parameters. FIG. 3 illustrates the configuration of the undulating protruding structure where the tool is fitted on a blade having a maximum blade thickness T (measured perpendicular to the blade chord), where the undulating peak-to-peak spacing or wavelength is L, the height or peak-to-trough distance H and diameter Ø.

For a utility scale turbine with blade of about 50 m in length, the diameter Ø of protruding structure 34 is preferably in the range 6-15 mm, more preferably about 8 to 10 mm. The optimal height of undulations H is related to the maximum blade thickness T, with the ratio H/T being preferably in the region of 20%-100%, more preferably 20%-40%. The ratio H/L is preferably about 10-30%, more preferably 15-20%, and more preferably about 15%. Note that where the undulations extend alternately a short distance over the blade surfaces, the dimension H is the dimension of the projection of the undulation e.g. viewed end on as in FIG. 3. Note also that whilst the maximum blade thickness T is not exactly constant along the length of the blade, from a position where the open end 16 of the sleeve is fitted to a position several meters form the tip the thickness is sufficiently constant that the above parameters hold. Alternatively, an average can be taken along the portion of the blade which is covered by the tool. In a blade of about 55 m length the value of L is preferably between 150 mm and 300 mm, more preferably about 190 mm.

Note that whilst the undulations appear generally regular in FIGS. 2 and 3 it is preferred that precise regularity is avoided, and that a degree of randomness exists. For example, the "peaks" and "troughs" should preferably not be aligned across the blade. This degree of randomness further helps to ensure that symmetric vortex shedding is avoided. In practice, the protruding structures described and secured to a net-like material will inevitably have significant irregularity.

The above assumes, subject to the above comments, generally regular undulations. However, in an alternative structure the undulations may be deliberately varied in pitch and height. In one form they may be varied according to length along the sleeve, becoming more closely spaced and of lesser height as one approaches the tip end 18.

The protruding structure or structures may extend along all or a major part of the edge or edges of the tool, or may extend along only a proportion of the edges. The protruding structures may be provided in single lengths or in a number of separate joined pieces, or a number of separate spaced sections.

The tool as provided with the undulating protruding structures 34 is able to significantly reduce vortex induced vibrations. The mesh sleeve is able to effectively reduce stall-based effects, whilst the protruding structures 34 are able to provide additional disruption of the laminar flow, further preventing the regular vortex-producing flow formation/separation which otherwise can contribute to the formation of the vortex induced vibrations.

The process of securing the anti-oscillation tool 14 in the field is shown in FIG. 4 to which reference should now be made. First, the rotor is rotated to a position where one of the blades 10 points towards the ground, and the wind turbine is stopped. For safety, the wind turbine blades may be locked in this position, at least temporarily, while the service engineers are at work.

A service engineer in the hub of the rotor blade lets down the pull guide rope 24 from a position in the nacelle 6 or the hub 12 of the wind turbine 2, while securing the other end to the wind turbine body. A service engineer at the ground secures the pull guide rope 24 to the loop 22, and threads the ground line 26 guide rope through the loop 28. The service engineer in the hub 12 or nacelle 6 then applies a force to the guide rope 22, while the service engineer on the ground holds both ends of line 26. The service engineer in the hub 12 or the nacelle 6 can then pull on the pull guide rope 22 to pull the open end of the sleeve 14 towards the tip of the wind turbine blade 10. As shown in FIG. 5, the resilient reinforcement 20 keeps the end of the sleeve open allowing it, with some care and attention, to be threaded over the tip of the blade 10. The ground engineer, having a better view point of the blade tip, which for obvious reasons is preferably directed towards the ground for this procedure, is crucial in guiding the open end 16 of the sleeve into place. Once the sleeve has been threaded over the blade 10, the service engineer in the nacelle 6 or hub 12 can pull further on the pull guide rope 22 sliding the resilient reinforcement 20 upwards and along the length of the blade until it can slide no further. The increasing diameter of the blade 10 in the direction of the root will mean that it will eventually fill out the sleeve preventing further movement, or otherwise the tip of the blade 10 will meet the closed end 18 of the sleeve. In this situation the diameter of the blade 10 will have taken up the slack in the sleeve material, and resilient reinforcement, so that the sleeve will adopt the shape shown in FIG. 2 pulled tight across the chord direction of the blade.

Once the sleeve is in place, the service engineer in the nacelle 6 or hub 12 secures the end of the pull guide rope 24 not attached to the loop 22 to a suitable location on the wind turbine structure (a dedicated tie-off point can be provided for this purpose if required, though one is not strictly necessary). The hub 12 or blade root is preferred for the tie-off point however, as it allows the tie-off points to rotate with the wind turbine blades. The service engineer at the ground then lets go of one end of the ground line 26 and pulls the rope from the lower loop 28. The sleeve is then in place, and can be detached from the wind turbine simply be releasing the attachment of the pull guide rope 24 to the wind turbine structure. To attach the sleeve to the other blades 10 of the wind turbine, the blades are sequentially manoeuvred to point towards the ground, and the process described above is repeated. Once a sleeve is attached to each blade, the rotor 8 can be locked in place.

The tool 14, once in place on wind turbine blades 10, limits vortex shedding induced oscillation of the wind turbine blade, by deliberately causing turbulent air flow at the blade edges and randomising the attachment/vortex shedding effect, reducing the oscillations and the possibility of blade damage.

While the present invention has been illustrated by the description of various embodiments thereof, and while the embodiments have been described in considerable detail, it is not intended to restrict or in any way limit the scope of the appended claims to such detail. The various features discussed herein may be used alone or in any combination. Additional advantages and modifications will readily appear to those skilled in the art. The invention in its broader aspects is therefore not limited to the specific details and illustrative examples shown and described. Accordingly, departures may be made from such details without departing from the scope of the general inventive concept.

What is claimed is:

1. A device for reducing vibrations in wind turbine blades at standstill comprising an elongate sleeve formed of a net-like material for fitting over the blades, wherein the sleeve is provided with at least one protruding structure extending along at least a part of the length of the sleeve having an undulating form.

2. The device according to claim 1, wherein the protruding structure or structures of undulating form is/are arranged along a length of the sleeve at positions which in use when fitted on a blade lie at a leading and/or trailing edge of the blade.

3. The device according to claim 1, wherein the sleeve is provided with a pair of protruding structures at opposite edges of the sleeve, which in use lie against leading and trailing edges of the blade.

4. The device according to claim 1, wherein the protruding structure or structures comprise a length of rope, wire or tubing or extruded material which is secured on or within the net-like material.

5. The device according to claim 4, wherein the length of chord, wire or tubing is incorporated into the seam of the net-like material sleeve.

6. The device according to claim 1, wherein the protruding structure or structures is constituted by a seam of the net-like material.

7. The device according to claim 1, wherein the protruding structure or structures extends along the length of the sleeve, extending alternately onto one major surface of the sleeve, and the opposite major surface.

8. The device according to claim 1, wherein the protruding structure or structures have a diameter between about 0.6 mm and about 15 mm.

9. The device according to claim 8 wherein the protruding structure comprises a length of rope of about 8 mm diameter.

10. The device according to claim 1, wherein the undulations have a ratio of peak-to-trough distance (H) to peak-to-peak spacing (L) is in the range 10 to 30%.

11. The device according to claim 10, wherein the ratio of peak-to-trough distance (H) to peak-to-peak spacing (L) is about 15%.

12. The device according to claim 1, wherein when fitted on a wind turbine blade wherein the ratio of peak-to-trough distance (H) to blade thickness (T) is in the region 20 to 100%.

13. The device according to claim 12, wherein the ratio of peak-to-trough distance (H) to blade thickness (T) is 20-40%.

14. A wind turbine having one or more wind turbine blades, at least one blade having fitted thereon the device as defined in claim 1.

15. A method of operating a wind turbine to inhibit oscillations induced by the air flow across blades of the wind turbine when the wind turbine is in a non-operational mode using a device according to claim 1, the method comprising the steps of:

releasably locking a rotor of the wind turbine in place; and
securing and retaining whilst the wind turbine is in a non-operational mode one or more said devices in place on respective blades so that the sleeve of the device covers a region of the blade surfaces and provides a non-aerodynamic outer surface for inducing turbulence in the air flow across the blades.

* * * * *